(12) United States Patent
O'Neil

(10) Patent No.: US 8,909,201 B2
(45) Date of Patent: *Dec. 9, 2014

(54) METHODS, SYSTEMS, AND COMPUTER PROGRAM PRODUCTS FOR PROVIDING MULTIMEDIA INFORMATION SERVICES OVER A COMMUNICATION NETWORK

(75) Inventor: Douglas O'Neil, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/299,460

(22) Filed: Nov. 18, 2011

(65) Prior Publication Data

US 2012/0317596 A1 Dec. 13, 2012

Related U.S. Application Data

(63) Continuation of application No. 12/985,077, filed on Jan. 5, 2011, now Pat. No. 8,081,957, which is a continuation of application No. 12/345,893, filed on Dec. 30, 2008, now Pat. No. 7,890,087, which is a continuation of application No. 11/229,475, filed on Sep. 16, 2005, now Pat. No. 7,509,124.

(51) Int. Cl.
| | | |
|---|---|---|
| *H04M 3/42* | (2006.01) | |
| *H04N 21/258* | (2011.01) | |
| *H04N 21/2668* | (2011.01) | |
| *H04N 21/414* | (2011.01) | |
| *H04N 21/2343* | (2011.01) | |
| *H04N 7/173* | (2011.01) | |
| *H04N 21/426* | (2011.01) | |
| *H04N 21/6405* | (2011.01) | |

(52) U.S. Cl.
CPC ...... *H04N 7/17318* (2013.01); *H04N 21/25825* (2013.01); *H04N 21/2668* (2013.01); *H04N 21/41407* (2013.01); *H04N 21/23439* (2013.01); *H04N 21/42684* (2013.01); *H04N 21/6405* (2013.01)
USPC ........ 455/414.1; 455/403; 455/445; 455/411; 455/456.1; 455/518; 370/338

(58) Field of Classification Search
USPC ........... 455/414.1, 403, 445, 411, 456.1–457, 455/453.1, 432.2–432.3, 433, 518, 415, 455/517, 428, 422, 414.4; 370/338, 352, 370/328, 310
See application file for complete search history.

(56) References Cited

U.S. PATENT DOCUMENTS

| | | | |
|---|---|---|---|
| 7,509,124 | B2 | 3/2009 | O'Neil |
| 7,843,883 | B2 * | 11/2010 | Daly et al. ................... 370/331 |
| 7,890,087 | B2 | 2/2011 | O'Neil |
| 2004/0203854 | A1 | 10/2004 | Nowak |
| 2004/0249962 | A1 | 12/2004 | Lecomte |
| 2005/0014489 | A1 * | 1/2005 | Zhigang ..................... 455/414.2 |
| 2005/0227675 | A1 | 10/2005 | Lim et al. |

(Continued)

*Primary Examiner* — Shahriar Behnamian
(74) *Attorney, Agent, or Firm* — Myers Bigel Sibley & Sajovec, PA

(57) ABSTRACT

In a communications network, a network access point address is determined that is currently associated with at least one of a plurality of subscriber mobile devices associated with a subscription to an information service. Content associated with the information service is formatted to provide subscriber content that is configured to be used by the plurality of subscriber mobile devices. The subscriber content is broadcast from a transmitter at the determined network access point address to the at least one subscriber mobile device over a wireless network.

19 Claims, 4 Drawing Sheets

(56) References Cited

U.S. PATENT DOCUMENTS

| | | |
|---|---|---|
| 2005/0245241 A1* | 11/2005 | Durand et al. ............. 455/414.1 |
| 2006/0015580 A1 | 1/2006 | Gabriel et al. |
| 2006/0166649 A1 | 7/2006 | Roach, Jr. |
| 2006/0195565 A1 | 8/2006 | De-Poorter |
| 2006/0252439 A1* | 11/2006 | Cai ............................. 455/515 |
| 2006/0291419 A1* | 12/2006 | McConnell et al. .......... 370/331 |
| 2007/0281665 A1 | 12/2007 | Cho et al. |

* cited by examiner

METHODS, SYSTEMS, AND COMPUTER PROGRAM PRODUCTS FOR PROVIDING MULTIMEDIA INFORMATION SERVICES OVER A COMMUNICATION NETWORK

CROSS REFERENCE TO RELATED APPLICATIONS

The present application is a continuation of U.S. patent application Ser. No. 12/985,077, filed Jan. 5, 2011, now U.S. Pat. No. 8,081,957 which is a continuation of U.S. patent application Ser. No. 12/345,893, filed Dec. 30, 2008 (now U.S. Pat. No. 7,890,087), which is a continuation of U.S. patent application Ser. No. 11/229,475, filed Sep. 16, 2005 (now U.S. Pat. No. 7,509,124), the disclosures of which are hereby incorporated by reference in their entireties.

FIELD OF THE INVENTION

The present invention relates to communications networks and methods of operating the same, and, more particularly, to providing services over a communications network.

BACKGROUND OF THE INVENTION

Communications networks are widely used for nationwide and worldwide communication of voice, multimedia and/or data. As used herein, communications networks include public communications networks, such as the Public-Switched Telephone Network (PSTN), terrestrial and/or satellite cellular networks, and/or the Internet.

In communications networks, a signal may be broadcast throughout the entire network and/or a portion thereof, and devices connected to the network that are authorized to receive the broadcast may have a decoder capability to decode the signal, thereby allowing end users to access the communication. For example, premium content cable television channels such as Home Box Office (HBO) may be encoded/scrambled and transmitted over a cable network. A premium content subscriber may have a device, usually at the subscriber premises, that may be configured to decode/descramble the premium content channel for viewing by the subscriber. However, cable TV subscribers who do not subscribe to the premium content channels may not have such a device, and may therefore be unable to decode and/or view the premium content channels.

Paging is another type of communications service where subscribers may receive one-way communications over a network at the exclusion of other users of the network. A pager is a small radio receiver which may constantly monitor a specific radio frequency that is dedicated to pager use. Each pager may monitor for a specific identification string, also called a capcode, which may alert the pager that an incoming message is addressed to the pager. As such, a specific pager may activate only when it "hears" its capcode over the air. A group of pagers that subscribe to a service may monitor for a common capcode, thereby allowing all pagers that subscribe to that service to receive a common message related to the service. For example, pager users who subscribe to a sports news services may monitor for a common capcode specified by the sports news services, and as such, all subscribing users may receive sports content that is transmitted with the capcode. However, pager users who do not subscribe to the sports service may not receive the sports content, as such pagers may not be configured to monitor for the specified capcode.

The broadcast methods employed in the communications services described above may be suitable where dedicated radio channels are provided and/or where bandwidth is sufficient. However, such methods may be costly in networks designed for point-to-point communications, such as cellular, Wi-Fi, and/or Wi-MAX networks. In cellular networks, for example, a cellular carrier can create a short message system (SMS) broadcast message that may be broadcast to all subscribers who are served by designated cell towers. However, the system may not be designed to permit a specifically designated group within the SMS subscribers to receive SMS messages at the exclusion of others.

SUMMARY OF THE INVENTION

According to some embodiments of the present invention, a method of providing a multimedia information service over a communications network may include determining a network access point address currently associated with at least one of a plurality of subscriber mobile devices associated with a subscription to the information service. Content associated with the information service may be formatted to provide subscriber content that is configured to be used by the plurality of subscriber mobile devices. As such, the subscriber content may be configured to prevent some use thereof by devices that are not associated with the subscription to the information service. The subscriber content may be broadcast from a transmitter at the determined network access point address to the at least one subscriber mobile device over a wireless network.

The subscriber content may not be broadcast from base station transceivers at network access point addresses other than the determined network access point address. Accordingly, a single communication may be provided to multiple subscriber mobile devices over a wireless network at the exclusion of non-subscriber mobile devices in real time and/or in near real time. In this way, a service provider may save network resources by sending one communication of subscriber content to multiple subscriber mobile devices in one or more parts of the network. The service provider may not need to establish a one-to-one communication with each subscriber mobile device, thereby conserving network resources.

In some embodiments, the content associated with the information service may be encrypted to provide the subscriber content. The subscriber content may be configured to be decrypted by the plurality of the subscriber mobile devices. In other embodiments, an information service request may be received from at least one of the plurality of subscriber mobile devices. The network access point address may be determined based on the information service request. In addition, at least one of the plurality of subscriber mobile devices may be authenticated as associated with the subscription to the information service responsive to receiving the information service request therefrom.

In some embodiments, a subscriber subgroup associated with at least one of the plurality of subscriber mobile devices may be identified responsive to receiving the information service request. The content associated with the information service may be determined by the identified subscriber subgroup. The content may be formatted to provide subscriber subgroup content that may be configured to be decoded by ones of the plurality of subscriber mobile devices that are associated with the subscriber subgroup.

In other embodiments, a request for particular content associated with the information service may be received from at least one of the plurality of subscriber mobile devices. Subscriber specific content may be broadcast based on the received request for the particular content.

In some embodiments, a presence of at least one of the plurality of subscriber mobile devices may be detected based on a network registration request transmitted therefrom. The network access point address may be determined based on the network registration request. In addition, at least one of the plurality of subscriber mobile devices may be authenticated as associated with the subscription to the information service based on the network registration request therefrom.

In other embodiments, an available content indicator that is configured to be decoded by the plurality of subscriber mobile devices may be broadcast from the transmitter at the determined network access point address to the at least one of the plurality of subscriber mobile devices responsive to determining the network access point address.

In some embodiments, device type and/or capabilities of at least one of the plurality of subscriber mobile devices may be determined. The content associated with the information service may be formatted based on the determined device type and/or capabilities.

In other embodiments, network conditions at the determined network access point address may be determined. The content associated with the information service may be formatted based on the determined network conditions.

In some embodiments, a physical location of at least one of the plurality of subscriber mobile devices may be determined based on the determined the network access point address. The content associated with the information service may be formatted based on the determined physical location.

In other embodiments, a communication session may be established with ones of the plurality of subscriber mobile devices currently associated with the determined network access point address. The subscriber content may be broadcast from the transmitter at the determined network access point address to the ones of the plurality of subscriber mobile devices over the wireless network using a frequency, time slot, and/or spreading code associated with the communication session.

In some embodiments, the content associated with the information service may be real time and/or near real time multimedia content, such as sports content, emergency content, and/or traffic content.

According to further embodiments of the present invention, a system for providing a multimedia information service over a communications network may include a limited broadcast application server and a transmitter coupled to the limited broadcast application server. The limited broadcast application server may be configured to format content associated with the information service to provide subscriber content that is configured to be received by a plurality of subscriber mobile devices that are associated with a subscription to the information service. The limited broadcast application server may be further configured to determine a network access point address currently associated with at least one of the plurality of subscriber mobile devices, and may be configured to provide the subscriber content to the determined network access point address. The transmitter may be configured to broadcast the subscriber content from the determined network access point address to at least one of the plurality of subscriber mobile devices over a wireless network.

In some embodiments, the limited broadcast application server may be configured to format the content associated with the information service to prevent at least some use thereof by devices that are not associated with the subscription to the information service.

In other embodiments, the limited broadcast application server may be configured to determine the network access point address based on a network registration request and/or an information service request transmitted from at least one of the plurality of subscriber mobile devices.

In some embodiments, the system may further include a subscriber database including device type and/or capability information for one or more of the plurality of subscriber mobile devices. The limited broadcast application server may be configured to determine the device type and/or capabilities for at least one of the plurality of subscriber mobile devices using the subscriber database, and may be further configured to format the content associated with the information service based on the determined device type and/or capabilities to provide the subscriber content.

In other embodiments, the subscriber database may include subgroup information for ones of the plurality of subscriber mobile devices. The limited broadcast application server may be configured to identify a subscriber subgroup associated with at least one of the plurality of subscriber mobile devices using the subscriber database. The limited broadcast application server may be further configured to determine the content associated with the information service based on the identified subscriber subgroup, and may be configured to format the content to provide subscriber content that is configured to be decoded by ones of the plurality of subscriber mobile devices associated with the subscriber subgroup.

In some embodiments, the system may further include a network access point database including network access point addresses for ones of the plurality of subscriber mobile devices and physical locations corresponding to the network access point addresses. The limited broadcast application server may be further configured to determine a physical location of at least one of the plurality of subscriber mobile devices based on the determined network access point address, and may be configured to format the content associated with the information service based on the determined physical location.

In other embodiments, the network access point database may further include network condition information for the network access point addresses. The limited broadcast application server may be configured to determine network conditions at the determined network access point address, and may be configured to format the content associated with the information service based on the determined network conditions.

According to still further embodiments of the present invention, a mobile device may include a controller and a transceiver coupled to the controller. The controller may be configured to provide identification data to identify the mobile device as one of a plurality of subscriber mobile devices associated with a subscription to an information service. A transceiver may be configured to transmit the identification data and receive subscriber content that is configured to be used by the plurality of subscriber mobile devices from a transmitter at a network access point address currently associated with a mobile device.

Other methods, systems, devices, and/or computer program products according to other embodiments of the invention will be or become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
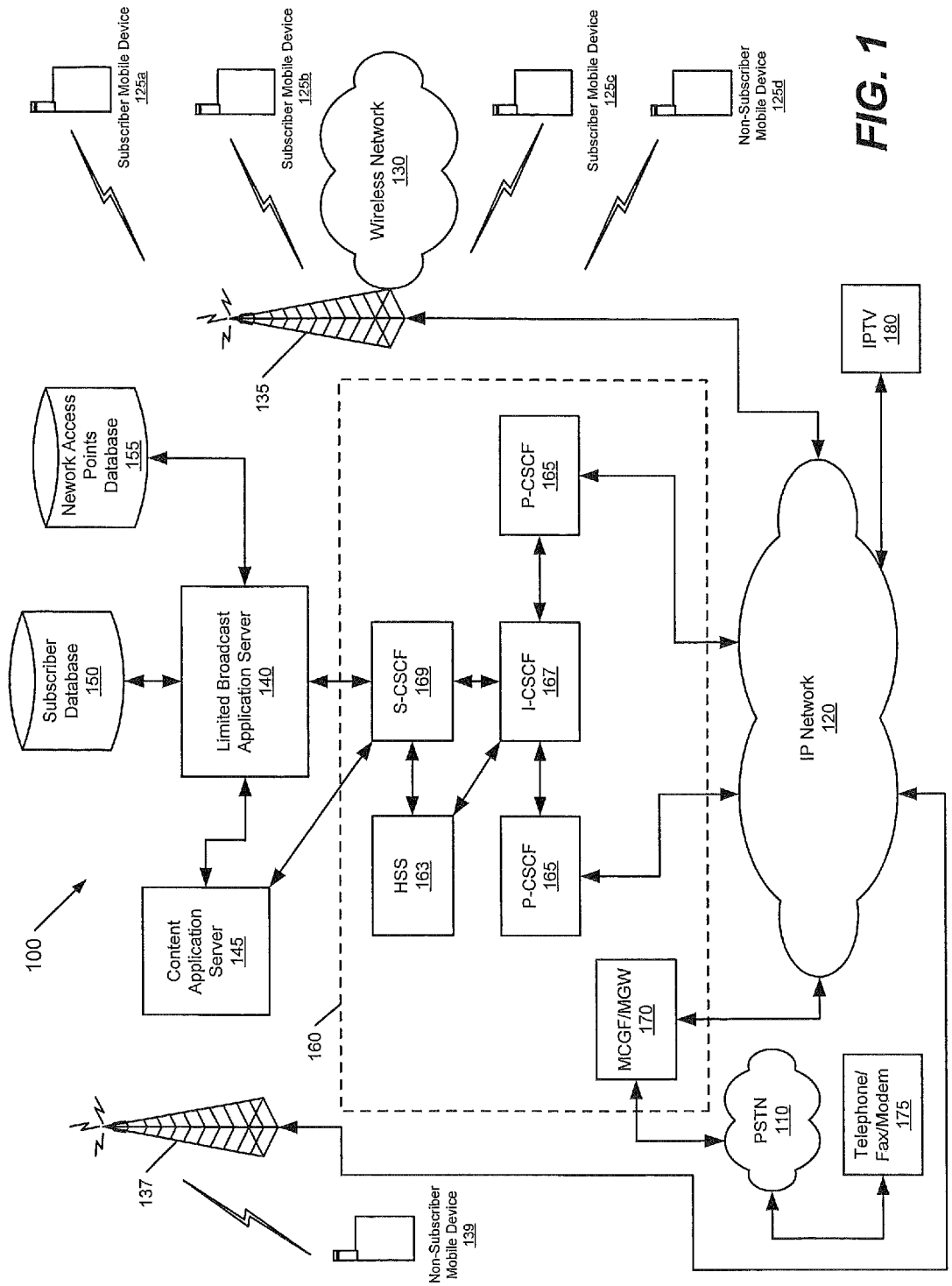
FIG. 1 is a block diagram that illustrates a communications system that may facilitate providing a multimedia information service according to some embodiments of the present invention.

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The present invention may be embodied as methods, systems, mobile devices, and/or computer program products. Accordingly, the present invention may be embodied in hardware and/or in software (including firmware, resident software, micro-code, etc.). Furthermore, the present invention may take the form of a computer program product on a tangible computer-usable or computer-readable storage medium having computer-usable or computer-readable program code embodied in the medium for use by or in connection with an instruction execution system. In the context of this document, a computer-usable or computer-readable medium may be any medium that can contain, store the program for use by or in connection with the instruction execution system, apparatus, or device.

The computer-usable or computer-readable medium may be, for example but not limited to, a non-transitory electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

As used herein, the term "IP terminal" or "IP device" may refer to a terminal or device that may communicate using the session initiation protocol (SIP). Thus, a "mobile IP device" may be a device that includes both characteristics of a "mobile terminal or device" and an "IP terminal or device." It will be understood that an IP terminal or device may also refer to devices that communicate using SIP via a media gateway, which translates communications, for example, between an IP network and another network, such as the public switched telephone network or a circuit switched wireless network.

As used herein, the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

Some embodiments of the present invention may arise from a realization that existing methods for broadcasting a message and/or other content to a defined group of subscriber devices may not be cost-effective and/or may be impractical in a cellular network and/or other types of communications network designed for point-to-point communications. Accordingly, some embodiments of the present invention provide a more efficient and/or cost-effective means by which subscriber devices associated with a defined user group can receive a message and/or other content by intelligently broadcasting the message/content in a format such that only subscriber devices within the defined group and located at one or more determined locations may receive, view, and/or otherwise use the message/content. As such, other devices in the network that are outside of the defined user group may be prevented from receiving, viewing, and/or otherwise using the broadcast message/content.

FIG. 1 is a block diagram illustrating communications systems and methods for providing a multimedia information service according to some embodiments of the present invention. Referring now to FIG. 1, a communications system 100 includes a plurality of networks, such as a Public-Switched Telephone Network (PSTN) 110, an Internet Protocol (IP) network 120, and a wireless network 130. The PSTN 110 and the IP network 120 may include a plurality of customer premises equipment coupled thereto, such as a telephone/fax/ modem 175 and an Internet Protocol Television (IPTV) 180. The wireless network 130 includes one or more transmitters, such as base station transceivers 135 and 137, and includes a plurality of mobile devices 125a-125d and 139. The plurality of mobile devices may include subscriber mobile devices 125a-125c, which may be associated with a subscription to an information service, and non-subscriber mobile devices 125d and 139, which may not be associated with a subscription to the information service. The mobile devices 125a-125d are served by the base station transceiver 135, while the mobile device 139 is served by the base station transceiver 137.

The networks 110, 120, and/or 130 may utilize multiple wireless and/or wireline access protocols. For example, the wireless access protocols may include GSM GPRS, GSM EDGE, GSM UMTS, CDMA 1xRTT, CDMA EVDO, Wi-Fi, and/or Wi-MAX. The wireline access protocols may include, for example, DSL, cable modem, and/or Ethernet. The IP network 120 may represent a global network, such as the Internet, or other publicly accessible network. The IP network 120 may also, however, represent a wide area network, a local area network, an Intranet, or other private network, which may not accessible by the general public. Furthermore, the IP network 120 may represent a combination of one or more wired and/or wireless public and/or private networks and/or virtual private networks (VPN).

The communications system 100 may further include a limited broadcast application server 140, a content application server 145, a subscriber database 150, and a network access point database 155, which may be configured to provide an information service request to subscriber devices, such as the subscriber mobile devices 125a-125c. The limited broadcast applications server 140 may be coupled to the networks 110, 120, and/or 130 via an IP multimedia subsystem (IMS) network 160. IMS is a standard that has been developed to provide for control and integration of multimedia services in a packet-switched network. In particular, the IMS architecture defines a set of logical functions that use a signaling protocol, known as the session initiation protocol (SIP), to setup, maintain, and terminate packet-switched voice and data. More generally, the IMS network 160 may provide a standardized way to connect IP devices and networks using SIP.

Still referring to FIG. 1, the IMS network 160 includes a Home Subscriber Server (HSS) 163, and a plurality of Call/Session Control Function (CSCF) servers used to process signaling in the IMS network 160. The CSCF servers include an Interrogating Call Session Control Function (I-CSCF) server 167, a Proxy Call Session Control Function (P-CSCF) server 165, and a Serving Call Session Control Function (S-CSCF) server 169. The IMS network 160 also includes a Media Gateway Control Function server/Media Gateway (MGCF/MGW) 170, which receives communications from the PSTN 110, and translates the received circuit-switched network protocols to packet-switched protocols for use in the IP network 120. In other words, the MGCF/MGW provides a gateway between the PSTN 110 and the IP network 120.

The Home Subscriber Server (HSS) 163 is a database that stores user profile information and performs authentication and/or authorization of the user. The HSS 163 also stores initial filter criteria, and identifies the filters that may be engaged in a communications session to assist in processing and providing services during the session. The filter criteria may identify different application servers that may be engaged in the communications session to provide applications and services. The HSS 163 may also provide instructions that may define the conditions and/or logic under which application servers should be engaged in processing communications during the session.

The Call/Session Control Function (CSCF) servers are SIP servers used to process SIP signaling in the IMS 160. For example, the Proxy Call Session Control Function (P-CSCF) 165 is the first point of contact for IMS devices, for example, the subscriber mobile devices 125a-125c, into the IMS network 160. The P-CSCF 165 may be assigned to an IMS device during network registration, and may function in authenticating the IMS device. In other words, the P-CSCF 165 may be the first/last IMS network element that communicates with an endpoint IMS device. The Interrogating Call Session Control Function (I-CSCF) 167 communicates with the P-CSCF 165, and serves as the entry point for communications to the IMS network 160 from another network, such as the PSTN 110 or a cellular network.

The Serving Call Session Control Function (S-CSCF) 169 controls a communication session between endpoint devices, such as the subscriber mobile devices 125a-125c, and the limited broadcast application server 140. For example, when a subscriber device, such as the subscriber mobile device 125a, transmits a registration request to the network 120, the S-CSCF 169 may interrogate the HSS 163, and may extract the service data, initial filter criteria, and/or addresses of application servers associated with the subscriber mobile device 125a. The S-CSCF 169 may provide an information service to the subscriber mobile device 125a by setting up the communication session between the limited broadcast application server 140 and the mobile device 125a, retrieving content from and/or otherwise engaging the content application server 145 during the communication session, and ending the communication session upon receipt of a termination message from the subscriber mobile device 125a, for example, when a subscriber closes an information service application on the subscriber mobile device 125a.

More particularly, in order to provide an information service to the subscriber mobile devices 125a-125c, the communications system 100 includes the limited broadcast application server 140, the content application server 145, the subscriber database 150, and the network access point database 155. The subscriber database 150 includes a variety of information for mobile devices that are associated with a subscription to an information service, such as subscriber mobile devices 125a-125c. As such, the subscriber database 150 may include information regarding the particular information services associated with each of the subscriber mobile devices 125a-125c, and device type and/or device capabilities for the subscriber mobile devices 125a-125c. For instance, the subscriber database may provide that subscriber mobile device 125a is a PDA associated with a sports information service, and that subscriber mobile device 125b is a cellular telephone associated with an emergency information service. In addition, the subscriber database 150 may be updated to include device IP addresses and/or network locations (including network access point addresses) for a given communication session for the subscriber mobile devices 125a-125c. The subscriber database 150 may also include subgroup information associated with one or more of the subscriber mobile devices 125a-125c. For example, all of the subscriber mobile devices 125a-125c may be associated with a subscription to a sports news information service, while only some of the subscriber mobile devices 125a-125c may be associated with an information service for a particular sports team.

The content application server 145 maintains and/or provides the content that is to be transmitted to mobile devices associated with a subscription to an information service, such as the subscriber mobile devices 125a-125c. For example, the content application server 145 may be configured to provide real-time and/or near-real time multimedia content, such as sports content, emergency content, and/or real time traffic content, depending on the information service. The content may be provided, for example, using a known transmission technology, such as audio/video streaming. In some embodiments, the content application server 145 may also be configured to format the content associated with the information service to provide subscriber content that is encoded and/or otherwise configured to prevent at least some use by devices that are not associated with a subscription to the information service, such as non-subscriber mobile device 125d.

The network access point database 155 may include one or more network access point addresses currently associated with the subscriber mobile devices 125a-125c, and/or physical locations corresponding to the network access point addresses. The network access point database 155 may further include network condition information for the network access point addresses stored therein. For example, the network access point database 155 may provide the total number of subscriber and/or non-subscriber devices currently associated with a particular network access point address, and/or the currently available bandwidth at the particular network access point. As such, the network access point database 155 may allow network devices to determine the current network access point address, network conditions, and/or physical location of the subscriber mobile devices 125a-125c associated with a subscription for one or more information services.

The limited broadcast application server 140 provides the intelligence to route the information service content for broadcast only to particular locations within the network (based on the presence of mobile devices associated with a subscription to the information service) by accessing the subscriber database 150, the content application server 145, and/or the network access point database 155. More particularly, the limited broadcast application server 140 may be configured to determine one or more network access point addresses that are currently associated with one or more subscriber mobile devices, such the subscriber mobile devices 125a-125c. For example, the limited broadcast application server 140 may be configured to determine a network access point address associated with subscriber mobile device 125a based on a network registration request and/or an information service request transmitted from subscriber mobile device 125a. Such network access point address information may be stored, for example, in the network access point database 155.

The limited broadcast application server 140 may also be configured to encode and/or otherwise format content associated with an information service that is retrieved from and/or otherwise provided by the content application server 145. In some embodiments, the limited broadcast application server 140 may format the content associated with the information service to provide subscriber content that is configured to be received exclusively by the subscriber mobile devices 125a-125c and/or other devices which are associated with a subscription to the information service. In other words, the limited broadcast application server 140 may format the content to prevent at least some use of the content by any devices that are not associated with a subscription to the information service, such as non-subscriber mobile device 125d. For example, the limited broadcast application server 140 may encrypt the content using a known encryption technology, such as public-key cryptography.

The limited broadcast application server 140 may be further configured to broadcast the subscriber content from the one or more determined network access point addresses to one or more of the subscriber mobile devices 125a-125c over a wireless network, via one or more transmitters at the determined network access points, such as base station transceiver 135. More particularly, the limited broadcast application server 140 may be configured to establish a communication session with one or more of the subscriber mobile devices 125a-125c which are currently associated with a determined network access point address. For example, the communication session may be based on the Real-Time Transport Protocol (RTP), which is a packet-based communication protocol that adds timing and sequence information to each packet to allow the reassembly of packets to reproduce real time, audio and/or video information in IP audio and video environments. More generally, the communication session may employ any communication protocol which may support a bearer channel for the data communication session.

The limited broadcast application server 140 may also be configured to broadcast the subscriber content from one or more base station transceivers at the determined network access point address to one or more of the subscriber mobile devices 125a-125c using a frequency, time slot, and/or spreading code information specified for the communication session. As such, devices associated with the determined network access point address which are not associated with a subscription to the information service (such as non-subscriber mobile device 125d) may not be included in the communication session, and thus may be unable to receive the subscriber content using the specified frequency, time slot, and/or spreading code.

Moreover, the limited broadcast application server 140 may not broadcast the subscriber content from base station transceivers at network access point addresses other than the determined network access point address, such as base station transceiver 137. As such, mobile devices associated with network access point addresses other than the determined network access point address, such as non-subscriber mobile device 139, may not receive the subscriber content. In other words, the limited broadcast application server 140 may be configured to selectively broadcast the subscriber content only to network access point addresses that are currently associated with one or more subscribers to the information service. Accordingly, subscriber mobile devices may receive the subscriber content without establishing a one-to-one communication session with each subscriber mobile device, thereby conserving network resources.

Additional operations which may be performed by the limited broadcast application server 140 will now be described. For example, the limited broadcast application server 140 may access the subscriber database 150 and/or the network access point database 155 to determine device type, capabilities, and/or network condition information for the determined network access point address(es), and may format the content from the content application server 145 based on the determined device type, capabilities, and/or network condition information. For instance, where a large number of subscribers are currently associated with a particular network access point, the limited broadcast application server 140 may format the content to be provided to the subscriber mobile devices 125a-125c based on the currently available bandwidth at the determined network access point address. In addition, the limited broadcast application server 140 may format the content based on the processor, memory, and/or connection speed of one or more of the subscriber mobile devices. Accordingly, if the subscriber mobile devices 125a-125c at a given network access point have relatively high-speed processors and if sufficient bandwidth is available at the network access point, higher resolution audio/video content may be provided to the subscriber mobile devices 125a-125c.

Moreover, the limited broadcast application server 140 may determine a physical location of at least one of the subscriber mobile devices 125a-125c based on the determined network access point address, and may format the content associated with the information service based on the determined physical location. For example, the limited broadcast application server 140 may determine that the subscriber mobile device 125a is associated with a subscription to an emergency information service, and that the subscriber mobile device 125a is currently located in New York City. Accordingly, if emergency information service content is available, the limited broadcast application 140 may format and provide the emergency content along with maps and/or other specific data related to New York City. As another example, the limited broadcast application server 140 may determine that the subscriber mobile device 125b is associated with a subscription to a Disney Channel information service (which regularly provides cartoons and/or other Disney-related content), and that the subscriber mobile device 125a is currently located in Disney World. As such, the limited broadcast application server 140 may format and provide the subscriber mobile device 125b with content related to Disney World, such as area maps and/or other theme-park specific content.

Furthermore, the limited broadcast application server 140 may be configured to identify a subscriber subgroup associated with at least one of the subscriber mobile devices 125a-125c using the subscriber database 155. As such, the limited broadcast application server 140 may determine that particular content associated with the information service would be of interest to the identified subgroup, and may format the particular content to provide subscriber subgroup-specific content. The subscriber subgroup specific content may be configured to be decoded by only ones of the subscriber mobile devices 125a-125c that are associated with the subscriber subgroup. For example, while all of the subscriber mobile devices 125a-125c may be associated with a subscription for a sports news service which provides instant replays and/or statistical information, subscriber mobile devices 125a and 125b may be associated with a "premium" sports service that provides additional and/or otherwise exclusive sports content, such as player interviews and/or career highlight reels. As such, although the premium content may be broadcast from the same network access point address as the "regular" sports news service content, the premium service content may be encoded such that only subscriber mobile devices 125a and 125b may be able to decode and thereby view the premium content.

The mobile devices 125a to 125d may be laptop computers, notebook computers, handheld computers, personal communications system (PCS) terminals, personal digital assistants (PDA), pagers, and/or radiotelephones; however, the mobile devices 125a-125d need not all be identical. For example, one of the mobile devices 125a-125d may be a radiotelephone; another of the mobile devices 125a-125d may be a laptop, a notebook, and/or a handheld computer; and/or still another of the mobile devices 125a-125d may be a PDA. Alternatively, two or more of the mobile devices 125a-125d of the communications system 100 may be of a same type.

The mobile devices 125a-125d may each include a wireless local area network interface transceiver that supports communication over a wireless local area network. For example, a mobile device 125a may use a wireless local area network transceiver to establish a wireless communication session with the limited broadcast application server 140 via the base station transceiver 135 to receive the subscriber content. The wireless local area network interface transceiver, for example, may be provided according to a Wi-Fi (IEEE 802.11) and/or Wi-MAX standard. In addition, each of the mobile devices 125a-125d may include the functionality of a PLMN transceiver and/or wireless modem. As such, a mobile device 125a may also use a PLMN transceiver to establish a wireless communication session with the limited broadcast application server 140 over a cellular network, for example, using a packet switched connection such as that provided by the Enhanced Data GSM Environment (EDGE) standard, the General Packet Radio Service (GPRS) standard, and/or the Universal Mobile Telecommunications System (UMTS) standard.

Accordingly, a wireless communication session may be established between the limited broadcast application server 140 and one or more of the mobile devices 125a-125d that are associated with a subscription to an information service, such as subscriber mobile devices 125a-125c. Subscriber content associated with the information service may be transmitted from the limited broadcast application server 140 to the subscriber mobile devices 125a-125c using a wireless local area network transceiver, a PLMN transceiver, or some combination of the two. For example, subscriber mobile device 125a may use the wireless local area network transceiver to establish a wireless communication session with the limited broadcast application server 140, while the PLMN transceiver may be used for other applications supported by subscriber mobile device 125a. Alternatively, subscriber mobile device 125a may use the PLMN transceiver to establish a wireless communication session with the limited broadcast application server 140, while the wireless local area network transceiver may be used for other applications. As an additional alternative, subscriber mobile device 125a may use both the wireless local area network transceiver and the PLMN transceiver to establish wireless communication sessions with the limited broadcast application server 140 based on reliability, convenience, and/or other factors.

Exemplary operations which may be performed by the system 100 of FIG. 1 according to some embodiments of the present invention will now be described with reference to the IP multimedia subsystem (IMS) network 160 of FIG. 1. However, it should be noted that embodiments of the present invention may also be implemented over a cellular network by establishing a communication session between the subscriber mobile devices 125a-125c and the limited broadcast application server 140 according to a client-server architecture, rather than the IMS architecture illustrated in FIG. 1.

Referring again to FIG. 1, a subscriber to a particular information service turns on his subscriber mobile device 125a, and the subscriber mobile device 125a transmits a network registration request over the networks 130 and 120 to the P-CSCF 165. The P-CSCF 165 engages an IP session with the I-CSCF 167 responsive to the registration request. For example, the P-CSCF 165 may transmit a SIP invite message to the I-CSCF 167, and may transmit the registration information from the subscriber mobile device 125 as well as the network address information currently associated with the subscriber mobile device 125 to the I-CSCF 167. The I-CSCF 167 queries the HSS 163 to determine which S-CSCF it should engage, and based on the response, establishes an IP session with the S-CSCF 169. More particularly, the I-CSCF 167 may forward the SIP invite message with the network address information for the subscriber mobile device 125a to the S-CSCF 169.

The S-CSCF 169 queries the HSS 163 and obtains filter criteria from the HSS 163. The filter criteria may include instructions that it may define conditions under which the S-CSCF 169 may access the content application server 145 and/or the limited broadcast application server 140. The S-CSCF 169 also retains the location within the IP network 120 of the subscriber mobile device 125*a*. The S-CSCF 169 then sends the network address of the subscriber mobile device 125*a*, the IP address of the subscriber mobile device 125*a*, and the information services for which the subscriber mobile device 125*a* has a subscription to the network access point database 155. The S-CSCF 169 also informs the content application server 145 and/or the limited broadcast application server 140 that a presence of one or more subscribers has been detected.

When content is available, the content application server 145 so informs the S-CSCF 169, which transmits this information to the limited broadcast application server 140. The limited broadcast application server 140 accesses the subscriber database 150 and/or the network access point database 155, and provides information for one or more of the subscriber mobile devices 125*a*-125*c* to the content application server 145. The content application server 145 then transmits content associated with one or more information services associated with the subscriber mobile devices 125*a*-125*c* to the limited broadcast application server 140. In some embodiments, the limited broadcast application server 140 may retrieve the content associated with the information service(s) from the content application server 145.

The limited broadcast application server 140 formats the content from the content application server 145 to provide subscriber content that is configured to be decoded by one or more of the subscriber mobile devices 125*a*-125*c*. For example, the limited broadcast application server 140 may encrypt the content from the content application server 145 using, for example, public key cryptography, so that only devices associated with a subscription to the information service may decrypt the content. The limited broadcast application server 140 then transmits the subscriber content to the one or more network access points determined from the network access point database 155 over the IMS 160.

One or more transmitters, such as base station transceiver 135, at the one or more determined network access points broadcasts the subscriber content to the subscriber mobile devices 125*a*-125*c*. However, transmitters and/or base station transceivers at network access points other than the determined network access points, such as base station transceiver 137, do not broadcast the subscriber content. The subscriber mobile devices 125*a*-125*c* receive the broadcast content and decode the content, for example, using a decoding application available only to devices that are associated with a subscription to the information service. As such, a subscriber to the information service may display the received content on a screen of a subscriber mobile device.

Although FIG. 1 illustrates an exemplary communication network, it will be understood that the present invention is not limited to such configurations, but is intended to encompass any configuration capable of carrying out the operations described herein. For example, although the limited broadcast application server 140 and the content application server 145 are illustrated as separate network elements, the functionality of both the limited broadcast application server 140 and/or the content application server 145 may be included in the limited broadcast application server 140 and/or other single network element. In addition, although described above primarily with respect to packet-switched connections, the subscriber mobile devices 125*a*-125*c* may establish a wireless communication session with the limited broadcast application server 140 via a circuit switched connection.

Figure 2:
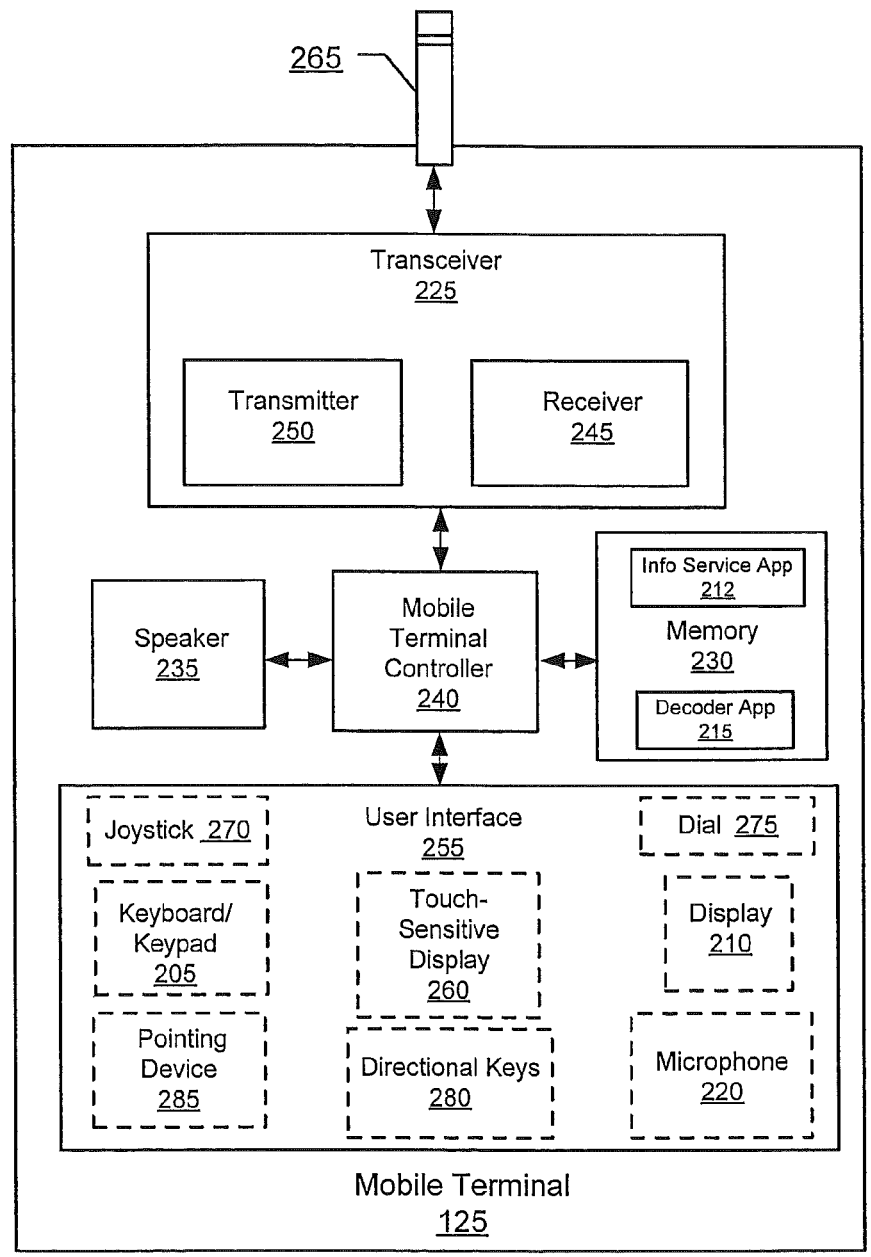
FIG. 2 is a block diagram of a mobile device configured to receive a multimedia information service according to some embodiments of the present invention.

FIG. 2 is a block diagram illustrating a subscriber mobile device 125 according to some embodiments of the present invention. The mobile device 125 may correspond to one of the subscriber mobile devices 125*a*-*c* of the communications system 100 of FIG. 1. As shown in FIG. 2 the subscriber mobile device 125 includes a transceiver 225, an antenna 265, a controller 240, a memory 230, a speaker 235, and a user interface 255. Depending on the functionalities offered by the subscriber mobile device 125, the user interface 255 may include a microphone 220, a display 210 (such as a liquid crystal display), a joystick 270, a keypad 205, a touch sensitive display 260, a dial 275, navigation/directional keys 280, and/or a pointing device 285 (such as a mouse, trackball, touchpad, etc.). However, additional and/or fewer elements of the user interface 255 may actually be provided. For example, the touch sensitive display 260 may be provided in a personal digital assistant (PDA) that does not include a display 210, a keypad 205, and/or a pointing device 285.

The transceiver 225 includes a transmitter 250 and a receiver 245. The transceiver 225 may be configured to receive subscriber content associated with an information service from a transmitter at a network access point address that is currently associated with the subscriber mobile device 125 via the receiver 245. The transceiver 225 may include a wireless local area network interface transceiver and/or a public land mobile network (PLMN) transceiver. Accordingly, the transceiver 225 may be configured to receive the subscriber content by establishing a communication session with the limited broadcast application server 140 of FIG. 1 using the PLMN transceiver. In addition, the transceiver 225 may also be configured to receive the subscriber content according to a wireless local area networking standard, such as Wi-Fi, using the wireless local area network interface transceiver. Network security for the wireless local area network, such as encryption and/or authentication, may be provided according to the applicable network standard being used. Also, while a single antenna 265 is illustrated in FIG. 2 by way of example, separate antennas may be provided for the PLMN transceiver and/or the wireless network interface transceiver. Alternatively, multiple antennas may be shared by the PLMN transceiver and the wireless network interface transceiver, and/or multiple antennas may be provided for one or both of the PLMN transceiver and the wireless network interface transceiver.

Still referring to FIG. 2, the controller 240 is coupled to the transceiver 225, the memory 230, the speaker 235, and the user interface 255. The controller 240 may be, for example, a commercially available or custom microprocessor that is configured to coordinate and manage operations of the transceiver 225, the memory 230, the speaker 235, and the user interface 255. As such, the controller 240 may be configured to provide identification data to identify the mobile device 125 as associated with a subscription to an information service. For example, the controller 240 may be configured to transmit an information service request via the transmitter 250, which may be used to identify the mobile device 125 as a subscriber to the information service. The information service request may be transmitted responsive to launching an information service application 212 stored in the memory 230. In addition, the controller 240 may be configured to transmit a network registration request via the transmitter 250 which may also be used to identify the mobile device 125 as a subscriber to the information service. The mobile device 125 may be authenticated as a subscriber to the information service based on the information service request and/or the network registration request, depending on the network security measures currently being used.

Accordingly, the controller 240 may be configured to establish a wireless data connection, such as a Wi-Fi and/or PLMN connection, with an information service provider, such as the limited broadcast application server 140 of FIG. 1, using the transceiver 225. The controller 240 may thereby receive subscriber content associated with the information service from a transmitter at a network access point currently associated with the mobile device 125 via the transceiver 225. The subscriber content may be configured to be received, decoded, and/or otherwise used only by mobile and/or other devices that are associated with a subscription to the information service, to thereby prevent at least some use of the subscriber content by devices that are not associated with the subscription to the information service. As such, the memory 230 may include a decoder application 215 configured to access the subscriber content. The decoder application 215 may only be available to devices associated with a subscription to the information service. For example, the decoder application 215 may be downloaded to the mobile device 125 directly from the information service provider.

Although FIG. 2 illustrates an exemplary mobile device that may be used to access subscriber content associated with a subscription to an information service, it will be understood that the present invention is not limited to such a configuration but is intended to encompass any configuration capable of carrying out the operations described herein. For example, although the memory 230 and the controller 240 are illustrated as separate components, the memory 230 or portions thereof may be included as part of the controller 240. More generally, while particular functionalities are shown in particular blocks by way of illustration, functionalities of different blocks and/or portions thereof may be combined, divided, and/or eliminated.

Computer program code for carrying out operations of the communications system 100 and/or mobile device 125 discussed above with respect to FIGS. 1 and 2 may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of systems, methods, and computer program products in accordance with some embodiments of the invention. These flowchart and/or block diagrams further illustrate exemplary operations of the communication system and mobile terminal/device architectures of FIGS. 1 and 2. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
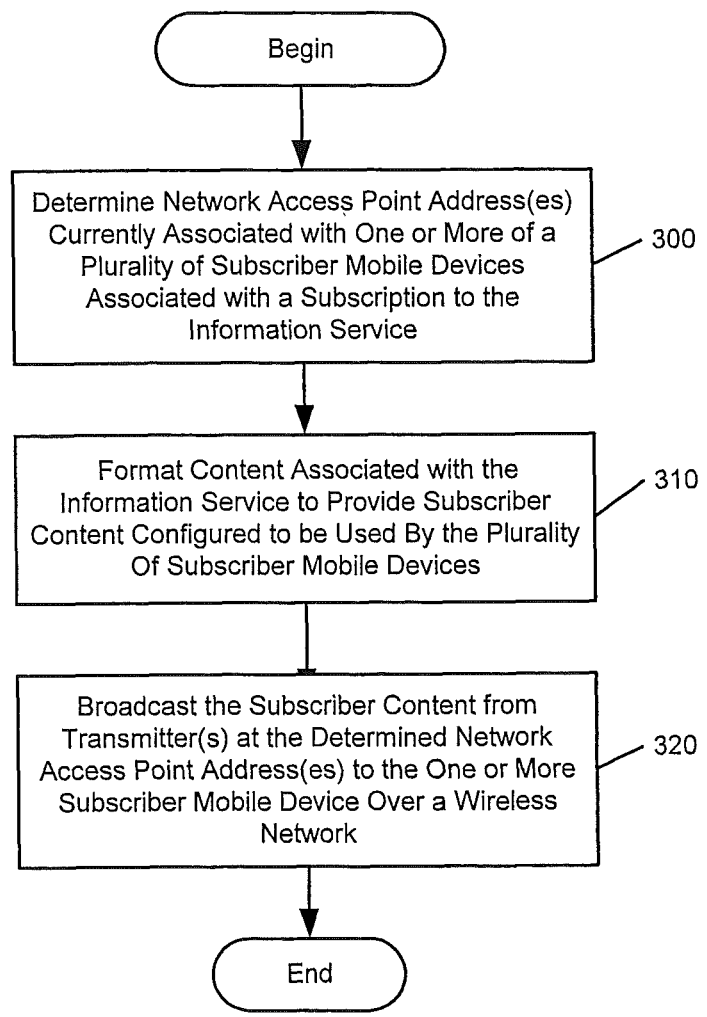
FIGS. 3 and 4 are flowcharts illustrating operations for providing a multimedia information service over a communications network according to some embodiments of the present invention.

FIG. 3 is a flowchart illustrating exemplary operations for providing a multimedia information service over a communications network according to some embodiments of the present invention. Referring now to FIG. 3, operations begin when a network access point address that is currently associated with at least one of a plurality of subscriber mobile devices that are associated with a subscription to an information service is determined at Block 300. For example, an information service request may be received from one of the group of subscriber mobile devices responsive to launching an information service application on the subscriber mobile device. The network access point address currently associated with the subscriber mobile device may then be determined based on the information service request. In addition, the network access point address may be determined based on a network registration request transmitted from the subscriber mobile device. The subscriber mobile device may also be authenticated as associated with a subscription to the information service responsive to receiving the information service request and/or the network registration request therefrom.

Still referring to FIG. 3, content associated with the information service is formatted to provide subscriber content at Block 310. The subscriber content may be configured to be received and/or otherwise used only by devices that are associated with a subscription to the information service. For example, the content associated with the information service may be encrypted using public key cryptography to provide subscriber content that is configured to be decrypted by the subscriber mobile devices. As such, the subscriber content may be configured to prevent at least some use thereof by devices that are not associated with the subscription to the information service. The content associated with the information service may be, for example, real time and/or near real time information content, such as sports, traffic, and/or emergency content. Particular content may also be requested by one or more of the group of subscriber mobile devices.

The subscriber content is provided to the determined network access point, and is broadcast from a transmitter at the determined network access point address to at least one of the group of subscriber mobile devices over a wireless network at Block 320. For example, the subscriber content may be broadcast over a cellular, Wi-Fi, and/or Wi-MAX network. In addition, where particular content has been requested by one or more of the subscriber mobile devices, the particular content may be formatted and broadcast from the transmitter such that only the requesting subscriber mobile devices may receive and/or decode the particular content. For example, the subscriber mobile devices may be presented with an option to view an instant replay from camera angles A and B, and the instant replay for angle A may be transmitted to subscriber devices who so request.

Figure 4:
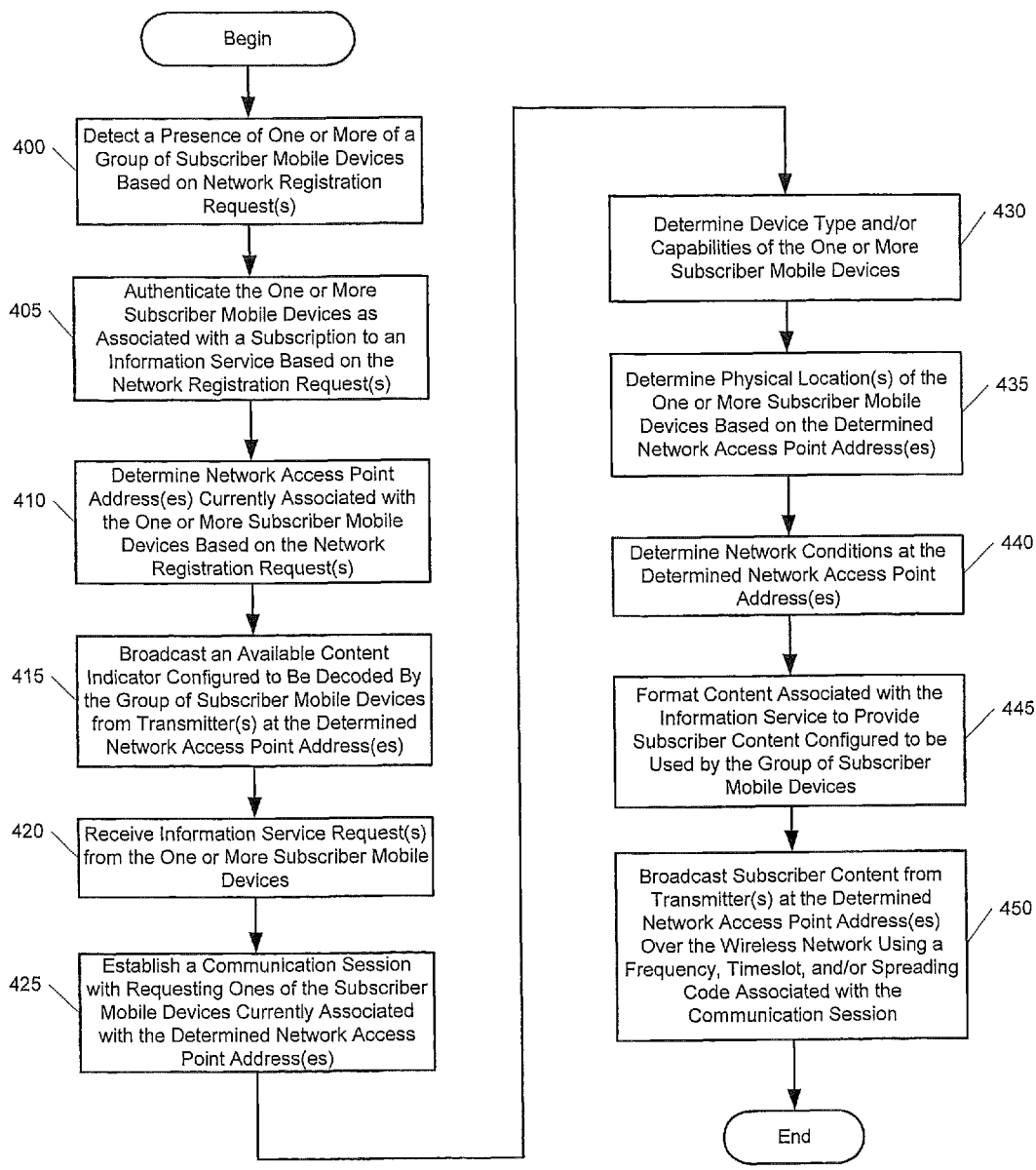

FIG. 4 is a flowchart illustrating further exemplary operations for providing an information service according to some embodiments of the present invention. Referring now to FIG. 4, operations begin when a presence of at least of one of a plurality of subscriber mobile devices is detected in a network at Block 400. For example, the presence of the one or more subscriber mobile devices may be detected based on a network registration request transmitted from the one or more subscriber mobile devices. The subscriber mobile devices may be authenticated as associated with a subscription to the information service based on the network registration request(s) at Block 405. For example, a database, such as the subscriber database 150 of FIG. 1, may be referenced to authenticate one or more of the subscriber mobile devices. One or more network access point addresses currently associated with the subscriber mobile devices is also determined based on the network registration request(s) at Block 410. More particularly, the network access point address(es) currently associated with the one or more subscriber mobile devices may be extracted from the network registration request(s) and stored in a database, such as the network access point database 155 of FIG. 1, which may be referenced to determine the network access point address(es).

Responsive to determining the network access point address(es) currently associated with one or more of the subscriber mobile devices, an available content indicator is broadcast from one or more transmitters at the determined network access point address(es) at Block 415. An information service request from one or more of the group of subscriber mobile devices is then received at Block 420. For example, one or more of the subscriber mobile devices that wish to receive content associated with the information service may transmit the information service request responsive to launching an information service application. The information service application may be exclusive to the subscriber mobile devices, and as such mobile devices that are not associated with a subscription to the information service may not be configured to transmit such an information service request. A communication session may be established with one or more of the subscriber mobile devices located at the determined network access point responsive to receiving the information service request therefrom at Block 425. For example, the communication session may be based on the Real Time Transport Protocol (RTP) and/or another protocol that can support a bearer channel for the communication session.

Still referring to FIG. 4, device type and/or capability information for one or more of the subscriber mobile devices is determined at Block 430. For example, the device type and/or capabilities may be determined by referencing a subscriber database, such as the subscriber database 150. As such, device information including type of processor, available memory, and/or connection speed to the network may be determined for one or more of the subscriber mobile devices at the determined network access point address(es). Also, a physical location of one or more of the subscriber mobile devices may be determined based on the determined network access point address(es) at Block 435, and network conditions at the determined network access point address(es) may be determined at Block 440. For example, the physical location of one or more of the subscriber mobile devices and/or the network conditions at the determined network access point address(es) may be determined by referencing a database, such as the network access point database 155.

Content associated with the information service, such as sports, traffic, and/or emergency content, may be formatted to provide subscriber content that is configured to be used by the group of subscriber mobile devices at Block 445. The content may be formatted based on the determined device type(s) and/or capabilities, the physical location(s) of one or more of the subscriber mobile devices, and/or the determined network conditions at the determined network access point address (es). As such, the subscriber content may be optimized and/or otherwise formatted based on the currently available bandwidth at each network address, the physical location of each network address, and/or the particular capabilities of one or more of the subscriber mobile devices.

The subscriber content may be broadcast from one or more transmitters at the determined access point address(es) to one or more of the subscriber mobile devices over a wireless network at Block 450. For example, the subscriber content may be broadcast using a particular frequency, time slot, and/or spreading code associated with the communication session. As such, devices that are not associated with a subscription to the information service may not be included in the communication session, and such devices may be unable to receive the subscriber content at the specified frequency, time slot, and/or spreading code. In addition, the subscriber content may not be broadcast from base station transceivers at network access point addresses other than the determined network access point address(es). Accordingly, a single communication may be provided to multiple subscribers over a wireless network at the exclusion of non-subscribers in real time and/or in near real time.

The flowcharts of FIGS. 3 and 4 illustrate the architecture, functionality, and operations of embodiments of the communication system 100 and/or mobile device 125 hardware and/or software. In this regard, each block may represent a module, a segment, or a portion of code, which may comprise one or more executable instructions for implementing the specified logical functions. It should also be noted that in other implementations, the functions noted in the blocks may occur out of the order noted in FIGS. 3 and 4. For example, two blocks shown in succession may, in fact, be executed substantially concurrently, or the blocks may sometimes be executed in the reverse order, depending on the functionality involved.

Operations for providing a multimedia information service over a communications network will be described in the following example with reference to FIG. 4. In this example, Joe is a subscriber to an NFL "premium" football service through a service provider. As part of this service, Joe receives NFL instant replays and/or other exclusive NFL content for his favorite teams and players. The service provider's network includes intelligence to determine which devices Joe is using at a given moment, such as his IPTV (Internet Protocol Television) device or his multimedia mobile device. One day, Joe is watching his favorite NFL football team, the Atlanta Falcons, "live" in the Georgia Dome. Joe has his multimedia mobile device with him, and is ready to receive an instant replay as part of his NFL premium football service. When Joe turns on his multimedia mobile device, his device registers to the wireless service provider, and a presence of Joe's multimedia mobile device is detected (Block 400).

During the registration/authentication process (Block 405), a limited broadcast application server in the network determines that Joe subscribes to the NFL premium service by referencing a subscriber database. In addition, the limited broadcast application server determines the network access point address currently associated with Joe and other subscribers to the NFL premium service (Block 410). As such, the limited broadcast application determines that Joe (and the other subscribers) are located in the Georgia Dome (Block 435), and thereby determines that Joe wishes to receive Atlanta Falcons content. The limited broadcast application server may also determine the device type of Joe's multimedia mobile device (Block 430) and/or current network conditions at transceivers serving the Georgia Dome (Block 440).

When Joe launches the NFL premium service application on his multimedia mobile device, Joe's multimedia mobile device transmits a request for his NFL premium football service. The premium service application may also receive an indication of available content from the limited broadcast application server (Block 415). Upon receiving the request (Block 420), the limited broadcast application server establishes a wireless communication session with Joe's multimedia mobile device (Block 425), and engages an NFL premium service application server. The limited broadcast application server sends a message to the NFL premium service application server to be notified when an instant replay and/or other exclusive NFL content will be available.

When an instant replay is available, the limited broadcast application receives the instant replay from the NFL premium service application server, formats the instant replay such that only subscriber devices may be able to view it (Block 445), and broadcasts the instant replay over the cell site transceivers that are serving the Georgia Dome in an encoded fashion (Block 450). However, cell site transceivers in other network locations may not broadcast the instant replay. The NFL premium service application on Joe's (and the other subscribers') multimedia mobile device includes a decoder application which decodes the replay and allows the multimedia mobile device to display the replay for Joe (and the other subscribers to the service). Non-subscribers to the NFL premium service who are in the Georgia Dome may not have the NFL premium service application on their mobile devices, and as such, may be unable to decode and/or view the instant replay on their multimedia mobile devices.

Accordingly, as illustrated in the above example, a service provider may save network resources by sending one communication of the instant replay to multiple subscribers of the NFL premium service in one part of the network. In so doing, the service provider may not need to establish a one-to-one communication with each subscriber of the NFL premium service to send the replay, thereby conserving network resources.

Thus, according to some embodiments of the present invention, a multimedia information service may be provided to a group of subscriber devices associated with a subscription to the information service over a wireless network. The information service may be broadcast only from one or more network access point addresses that are currently associated with one or more of the group of subscriber mobile devices, thereby saving network resources. In addition, the information service content may be configured and/or formatted such that only the defined group of subscriber devices may receive and/or otherwise use the content. As such, devices that are not associated with a subscription to the information service may be prevented from receiving and/or otherwise using the subscriber content provided by the broadcast.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method for providing a multimedia information service over a communications network, the method comprising:
   determining, among a plurality of network access point addresses, a common network access point address currently associated with ones of a plurality of subscriber mobile devices responsive to accessing a network access point database, the plurality of subscriber mobile devices being associated with respective subscriptions to the multimedia information service;
   formatting subscriber content for use by the plurality of subscriber mobile devices based on capability information for the ones of the plurality of subscriber mobile devices; and
   selectively providing the subscriber content to the common network access point address that was determined, based on its association with the ones of the plurality of subscriber mobile devices, for broadcast to the ones of the plurality of subscriber mobile devices over a wireless network by a transmitter associated with the common network access point address without establishing respective one-to-one communications with the ones of the plurality of subscriber mobile devices and such that the subscriber content is not provided to an other network access point address, different than the common network access point address, among the plurality of network access point addresses.

2. The method of claim 1, further comprising:
   identifying the plurality of subscriber mobile devices among a plurality of mobile devices responsive to accessing a subscriber database,
   wherein the subscriber content that is broadcast comprises same content for use by the plurality of subscriber mobile devices, and wherein the subscriber content is formatted to prevent at least some use of the subscriber content by devices that are not associated with respective subscriptions to the information service.

3. The method of claim 1, wherein the other network access point address is not associated with any of the plurality of subscriber mobile devices.

4. The method of claim 3, wherein determining the network access point address comprises:
   receiving an information service request from the ones of the plurality of subscriber mobile devices; and
   determining the network access point address using information from the information service request.

5. The method of claim 4, further comprising:
   authenticating the ones of the plurality of subscriber mobile devices as associated with a respective subscription to the information service responsive to receiving the information service request from the ones of the plurality of subscriber mobile devices.

6. The method of claim 4, further comprising:
   identifying a subscriber subgroup associated with the ones of the plurality of subscriber mobile devices responsive to receiving the information service request; and
   selectively providing subscriber subgroup content to the network access point address that was determined, rather than to the other network access point address, for broadcast to the ones of the plurality of subscriber mobile devices over the wireless network,
   wherein the subscriber subgroup content is formatted to prevent at least some use of the subscriber subgroup content by ones of the plurality of subscriber mobile devices that are not associated with the subscriber subgroup.

7. The method of claim 1, wherein determining the network access point address comprises:
  detecting a presence of the ones of the plurality of subscriber mobile devices based on a network registration request transmitted from the ones of the plurality of subscriber mobile devices; and
  determining the network access point address based on the network registration request.

8. The method of claim 7, further comprising the following prior to selectively providing the subscriber content:
  broadcasting, from the transmitter associated with the network access point address, an available content indicator to be decoded by the plurality of subscriber mobile devices; and
  receiving an information service request from the ones of the plurality of subscriber mobile devices responsive to broadcasting the available content indicator; and
  establishing a communication session with the ones of the plurality of subscriber mobile devices responsive to receiving the information service request from the ones of the plurality of subscriber mobile devices.

9. The method of claim 1, further comprising:
  determining network conditions at the network access point address that was determined; and
  formatting the subscriber content based on the determined network conditions.

10. The method of claim 1, further comprising:
  determining a physical location of the ones of the plurality of subscriber mobile devices based on the network access point address that was determined; and
  formatting the subscriber content based on the determined physical location.

11. The method of claim 1, wherein selectively providing the subscriber content comprises:
  establishing a communication session with the ones of the plurality of subscriber mobile devices currently associated with the network access point address that was determined; and
  selectively broadcasting the subscriber content in accordance with a channel access method of the communication session.

12. A system for providing a multimedia information service over a communications network, comprising:
  a processor; and
  a memory that is coupled to the processor and comprises computer readable program code embodied in the memory that when executed by the processor causes the processor to perform operations comprising:
  determining, among a plurality of network access point addresses, a common network access point address currently associated with ones of a plurality of subscriber mobile devices associated with respective subscriptions to the multimedia information service responsive to accessing a network access point database,
  formatting subscriber content for use by the plurality of subscriber mobile devices based on capability information for the ones of the plurality of subscriber mobile devices, and
  selectively providing the subscriber content to the common network access point address that was determined, based on its association with the ones of the plurality of subscriber mobile devices, for broadcast to the ones of the plurality of subscriber mobile devices over a wireless network by a transmitter associated with the common network access point address without establishing respective one-to-one communications with the ones of the plurality of subscriber mobile devices and such that the subscriber content is not provided to an other network access point address, different than the common network access point address, among the plurality of network access point addresses.

13. The system of claim 12, wherein the operations further comprise:
  identifying the plurality of subscriber mobile devices among a plurality of mobile devices responsive to accessing a subscriber database,
  wherein the subscriber content that is broadcast comprises same content for use by the plurality of subscriber mobile devices, and wherein the subscriber content is formatted to prevent at least some use of the subscriber content by devices that are not associated with respective subscriptions to the information service.

14. The system of claim 12, wherein the other network access point address is not associated with any of the plurality of subscriber mobile devices.

15. The system of claim 12, further comprising:
  a subscriber database including respective capability information for the plurality of subscriber devices, and wherein the formatting the subscriber content further comprises:
  determining the capability information for the ones of the plurality of subscriber mobile devices using the subscriber database; and
  formatting the subscriber content based on the capability information that was determined prior to selectively providing the subscriber content to the common network access point address that was determined.

16. The system of claim 15, wherein the subscriber database further includes subgroup information associated with ones of the plurality of subscriber devices, and wherein the operations further comprise:
  identifying a subscriber subgroup associated with the ones of the plurality of subscriber mobile devices using the subscriber database; and
  selectively providing subscriber subgroup content to the network access point address that was determined, rather than to the other network access point address, for broadcast to the ones of the plurality of subscriber mobile devices over the wireless network,
  wherein the subscriber subgroup content is formatted to prevent at least some use of the subscriber subgroup content by ones of the plurality of subscriber mobile devices that are not associated with the subscriber subgroup.

17. The system of claim 12:
  wherein the network access point database includes respective network access point addresses currently associated with ones of the plurality of subscriber devices and physical locations corresponding to the network access point addresses,
  wherein the operations further comprise:
  determining a physical location of the ones of the plurality of subscriber mobile devices based on the network access point address that was determined; and
  formatting the subscriber content based on the physical location.

18. The system of claim 12, wherein the operations further comprise:
  determining network conditions at the network access point address that was determined; and
  formatting the subscriber content based on the network conditions prior to selectively providing the subscriber content to the common network access point address.

19. A mobile device, comprising:

a processor; and a memory that is coupled to the processor and comprises computer readable program code embodied in the memory that when executed by the processor causes the processor to perform operations comprising:

providing identification data that identifies the mobile device as one of a plurality of subscriber mobile devices for storage in a subscriber database, the plurality of subscriber mobile devices being associated with respective subscriptions to a multimedia information service;

providing a registration request that identifies the mobile device as being associated with a network access point address among a plurality of network access point addresses for storage in a network access point database; and responsive to providing the identification data and the registration request, receiving subscriber content formatted for use by the plurality of subscriber mobile devices that is selectively broadcast from a transmitter associated with the network access point address that is currently associated with ones of the plurality of subscriber mobile devices, based on its association with the ones of the plurality of subscriber mobile devices, without establishing respective one-to-one communications with the ones of the plurality of subscriber mobile devices, wherein the subscriber content comprises same content for use by the plurality of subscriber mobile devices, wherein the subscriber content is formatted to prevent at least some use of the subscriber content by devices that are not associated with respective subscriptions to the information service, and wherein the subscriber content is formatted based on capability information for the ones of the plurality f subscriber mobile devices, and wherein the subscriber content is not provided to a different network access point address, among the plurality of network access point addresses, that is not associated with any of the plurality of subscriber mobile devices.

\* \* \* \* \*

UNITED STATES PATENT AND TRADEMARK OFFICE
CERTIFICATE OF CORRECTION

PATENT NO.        : 8,909,201 B2  
APPLICATION NO.   : 13/299460  
DATED             : December 9, 2014  
INVENTOR(S)       : O'Neil Page 1 of 1

It is certified that error appears in the above-identified patent and that said Letters Patent is hereby corrected as shown below:

In the Claims:
Column 24, Claim 19, Line 15: Please correct "plurality f subscriber"
to read -- plurality of subscriber --

Signed and Sealed this
Twenty-first Day of April, 2015

Michelle K. Lee
*Director of the United States Patent and Trademark Office*